(12) United States Patent
Gao

(10) Patent No.: US 10,668,936 B2
(45) Date of Patent: Jun. 2, 2020

(54) PROCESSOR AND SYSTEM FOR TRAIN ASSISTANCE TRACKING AND EARLY-WARNING

(71) Applicant: Traffic Control Technology Co., Ltd, Beijing (CN)

(72) Inventor: Chunhai Gao, Beijing (CN)

(73) Assignee: Traffic Control Technology Co., Ltd, Beijing (CN)

( * ) Notice: Subject to any disclaimer, the term of this patent is extended or adjusted under 35 U.S.C. 154(b) by 125 days.

(21) Appl. No.: 15/976,700

(22) Filed: May 10, 2018

(65) Prior Publication Data
US 2019/0300031 A1 Oct. 3, 2019

(30) Foreign Application Priority Data
Apr. 2, 2018 (CN) .......................... 2018 1 0283128

(51) Int. Cl.
*B61L 23/04* (2006.01)
*G01S 13/91* (2006.01)
*G01S 13/931* (2020.01)

(52) U.S. Cl.
CPC ........... *B61L 23/041* (2013.01); *B61L 23/042* (2013.01); *G01S 13/91* (2013.01); *G01S 13/931* (2013.01); *G01S 2013/9323* (2020.01); *G01S 2013/9328* (2013.01)

(58) Field of Classification Search
CPC .................................................. B61L 23/041
See application file for complete search history.

(56) References Cited

FOREIGN PATENT DOCUMENTS

| CN | 202115549 U | | 1/2012 | |
|---|---|---|---|---|
| CN | 104386092 A | | 3/2015 | |
| CN | 205265833 U | | 5/2016 | |
| CN | 106715234 | * | 5/2017 | ............ B61L 23/041 |
| CN | 106715234 A | | 5/2017 | |
| CN | 107187467 A | | 9/2017 | |
| CN | 107336724 A | | 11/2017 | |
| CN | 206749826 U | | 12/2017 | |
| EP | 1215100 A1 | | 6/2002 | |

OTHER PUBLICATIONS

The First Official Action and search report dated Apr. 15, 2019 for Chinese Application No. 201810283128.1, 11 pages.

\* cited by examiner

*Primary Examiner* — Bao Long T Nguyen
*Assistant Examiner* — Michael A Berns
(74) *Attorney, Agent, or Firm* — Law Offices of Liaoteng Wang

(57) ABSTRACT

The present disclosure provides a processor and a system for train assistance tracking and early-warning. The processor includes a synthesis analysis unit configured to perform a synthesis logic analysis on information ahead of a train based on a preset logic synthesis rule; and an identification unit configured to identify an abnormal condition within a predetermined distance ahead of the train according to an analysis result, wherein the abnormal condition includes an appearance of any one or more of a signal machine, an obstacle, or a track turnout.

13 Claims, 6 Drawing Sheets

PROCESSOR AND SYSTEM FOR TRAIN ASSISTANCE TRACKING AND EARLY-WARNING

CROSS-REFERENCE TO RELATED APPLICATION

This application is based upon and claims priority to Chinese Patent Application No. 201810283128.1, filed on Apr. 2, 2018, the content of which is incorporated herein by reference in its entirety.

TECHNICAL FIELD

The present disclosure relates to the technical field of rail transportation, and particularly to a processor and a system for train assistance tracking and early-warning.

BACKGROUND

With the rapid development of rail transportation, it is especially important that a rail transportation system is reliable and its operation is efficient. However, existing trains are generally not equipped with a safety early-warning system. Most of them are operated by a driver at a fixed speed limit, so there are a large number of unstable factors due to human operations, resulting in low safety performance. Or only a simple early-warning alert is provided and cannot give a timely warning to the driver, so the safety performance is still very low. For example, some engineering vehicles do not have an ATP (Automatic Train Protection) device and can only be driven manually by the driver; or even if rail transportation vehicles are equipped with an ATP device, the current ATP device just has relatively simple functions and a low recognition accuracy. Such an ATP device may often wrongly identify obstacles that are not on the rail, or cannot give a timely alarm to provide enough reaction time for the driver.

SUMMARY

Embodiments of the present disclosure provide a processor and a system for train assistance tracking and early-warning.

In a first aspect, a processor for train assistance tracking and early-warning is provided. The processor includes a synthesis analysis unit and an identification unit, wherein the synthesis analysis unit is configured to perform a synthesis logic analysis on information ahead of a train based on a preset logic synthesis rule; the identification unit is configured to identify an abnormal condition within a predetermined distance ahead of the train according to an analysis result, wherein the abnormal condition includes an appearance of any one or more of a signal machine, an obstacle, or a track turnout; the information ahead of the train includes at least two types of the following information: first image information captured by a short-focus camera within a short-focus visibility distance ahead of the train, second image information captured by a long-focus camera within a predetermined distance ahead of the train, and information scanned by a laser radar within the predetermined distance ahead of the train; and the short-focus visibility distance is a distance at which the short-focus camera is able to identify a track outline, and the predetermined distance is longer than the short-focus visibility distance.

In a first possible implementation of the first aspect, when the information ahead of the train includes the first image information, the second image information and the scanned information, the preset logic synthesis rule includes: when each of the first image information, the second image information, and the scanned information contains an abnormal condition, the abnormal condition in the scanned information is regarded as the abnormal condition within the predetermined distance ahead of the train; or when only the first image information and the second image information contain an abnormal condition and the scanned information does not contain an abnormal condition, the abnormal condition in the first image information is regarded as the abnormal condition within the predetermined distance ahead of the train.

In a second possible implementation of the first aspect including the above possible implementation, the information ahead of the train further includes a positioning information within the predetermined distance ahead of the train.

In a third possible implementation of the first aspect including the above possible implementations, when the information ahead of the train includes the first image information, the second image information, the scanned information and the positioning information, the preset logic synthesis rule includes: when each of the first image information, the second image information, the scanned information and the positioning information contains an abnormal condition, the abnormal conditions in the scanned information and the positioning information are regarded as the abnormal conditions within the predetermined distance ahead of the train; or when only the first image information, the second image information and the scanned information contains an abnormal condition and the positioning information does not contain an abnormal condition, the abnormal condition in the scanned information is regarded as the abnormal condition within the predetermined distance ahead of the train.

In a second aspect, a system for train assistance tracking and early-warning is provided. The system includes an image collector, a laser radar and the processor of the first aspect that are disposed in the train, wherein: the image collector is configured to collect the first image information within the short-focus visibility distance ahead of the train and collect the second image information within the predetermined distance ahead of the train, wherein the short-focus visibility distance is a distance at which the short-focus camera is able to identify a track outline and the predetermined distance is longer than the short-focus visibility distance; the laser radar is configured to collect the scanned information within the predetermined distance ahead of the train; and the processor is configured to perform the synthesis logic analysis on the first image information, the second image information, and the scanned information based on the preset logic synthesis rule, and identify the abnormal condition within the predetermined distance ahead of the train based on the analysis result.

In a first possible implementation of the second aspect, the system further includes a camera device and a display, wherein: the camera device is configured to collect eye information of a driver and send the collected result to the processor; the processor is further configured to make a determination about the collected result and send a corresponding alarm information to the display when an eye blinking frequency of the driver is greater than a preset blinking frequency threshold and an eye-closed time is greater than a preset eye-closed time threshold; the display is configured to send an alert message to the driver in accordance with the alarm information; and the display is further configured to display the abnormal condition within the predetermined distance ahead of the train and display the alert message corresponding to the abnormal condition.

In a second possible implementation of the second aspect including the above possible implementations, the system further includes a dispatch center device configured to send out the alert message in accordance with the alarm information to remind changing the driver at a next station.

In a third possible implementation of the second aspect including the above possible implementations, the processor includes the identification unit configured to: determine that there is a single track and a signal machine but no obstacle within the predetermined distance ahead of the train, when the scanned information is normal and the first image information and/or the second image information only contain signal machine information; or determine that there is a track turnout and a signal machine but no obstacle within the predetermined distance ahead of the train, when the scanned information is normal and the first image information and/or the second image information only contain track turnout information and the signal machine information; or determine that there is a single track, but no signal machine and obstacle within the predetermined distance ahead of the train, when the scanned information, the first image information and the second image information are all normal; or determine that there is a single track, a signal machine and an obstacle within the predetermined distance ahead of the train, when the scanned information contains obstacle information and the first image information and/or the second image information contain merely the signal machine information; or determine that there is a track turnout, a signal machine and an obstacle within the predetermined distance ahead of the train, when the scanned information contains the obstacle information and the first image information and/or the second image information contain merely the track turnout information and the signal machine information; or determine that there is a single track and an obstacle but no signal machine within the predetermined distance ahead of the train, when the scanned information contains the obstacle information and both the first image information and the second image information are normal.

In a fourth possible implementation of the second aspect including the above possible implementations, the processor further includes an operating unit configured to: in the case that the scanned information contains the obstacle information and the first image information and/or the second image information contain only the signal machine information having color abnormal information, determine a first distance between the obstacle and the train and a second distance between the signal machine and the train, determine a first safety distance as a shorter distance between the first distance and the second distance, and send out a corresponding first safety alert signal based on the color abnormal information and the first safety distance; or in the case that the scanned information contains the obstacle information and the first image information and/or the second image information contain only the track turnout information and the signal machine information having color abnormal information, determine a first distance between the obstacle and the train and a second distance between the signal machine and the train, determine a second safety distance in a direction of a switch position of the track turnout as a shorter distance between the first distance and the second distance, and send out a corresponding second safety alert signal based on a first color abnormal information in the color abnormal information and the second safety distance; or in the case that the scanned information is normal and the first image information and/or the second image information contain only the track turnout information and normal signal machine information, determine a third safety distance as the short-focus visibility distance or a distance from the train to a center of the track turnout and send out a corresponding third safety alert signal based on the third safety distance.

In a fifth possible implementation of the second aspect including the above possible implementations, the system further includes a positioner, wherein: the positioner is configured to determine positioning information within the predetermined distance ahead of the train; and the processor is further configured to perform a synthesis logic analysis on the first image information, the second image information, the scanned information, and the positioning information based on a preset logic synthesis rule, and identify an abnormal condition within the predetermined distance ahead of the train according to an analysis result.

In a sixth possible implementation of the second aspect including the above possible implementations, the identification unit is further configured to: determine that there is a single track, a signal machine but no obstacle within the predetermined distance ahead of the train, when the scanned information is normal and the positioning information only contains the positioning information of the signal machine; or determine that there is a track turnout, a signal machine but no obstacle within the predetermined distance ahead of the train, when the scanned information is normal and the positioning information contains the positioning information of the signal machine and the track turnout; or determine that there is a single track, but no signal machine and obstacle within the predetermined distance ahead of the train, when both the scanned information and the positioning information are normal; or determine that there is a single track, a signal machine and an obstacle within the predetermined distance ahead of the train, when the scanned information contains the obstacle information and the positioning information only contains the positioning information of the signal machine; or determine that there is a track turnout, a signal machine and an obstacle within the predetermined distance ahead of the train, when the scanned information contains the obstacle information and the positioning information contains the positioning information of the signal machine and the track turnout; or determine that there is a single track, an obstacle but no signal machine within the predetermined distance ahead of the train, when the scanned information contains the obstacle information and the positioning information is normal.

In a seventh possible implementation of the second aspect including the above possible implementations, the operating unit is further configured to: in the case that the scanned information contains the obstacle information, the positioning information contains only the positioning information of the signal machine and the first image information and/or the second image information contain the signal machine information having color abnormal information, determine a first distance between the obstacle and the train and a second distance between the signal machine and the train, determine a first safety distance as a shorter distance between the first distance and the second distance, and send out a corresponding first safety alert signal based on the first safety distance; or in the case that the scanned information contains the obstacle information, the positioning information contains the positioning information of the signal machine and the track turnout and the first image information and/or the second image information contain the signal machine information having color abnormal information, determine a first distance between the obstacle and the train and a second distance between the signal machine and the train, determine a second safety distance in a direction of a switch position of the track turnout as a shorter distance between the first distance and the second distance, and send out a corresponding second safety alert signal based on a first color abnormal information in the color abnormal information and the second safety distance; or in the case that the scanned information is normal, the positioning information contains the positioning information of the signal machine and the track turnout and the first image information and/or the second image information contain normal signal machine information, determine a third safety distance as the short-focus visibility distance or a distance from the train to a center of the track turnout, and send out a corresponding third safety alert signal based on the third safety distance.

In an eighth possible implementation of the second aspect including the above possible implementations, wherein the obstacle information includes at least one of the following information: information indicating that a length of a track outline in an image is less than the short-focus visibility distance, information indicating that the length of the track outline is less than the predetermined distance, and reflection information in the scanned information.

BRIEF DESCRIPTION OF THE DRAWINGS

To illustrate technical solutions in one or more embodiments of the present disclosure more clearly, a brief introduction on the drawings which are needed in the description of the embodiments of the present disclosure is given below. It is obvious that the drawings described below are merely some embodiments of the present disclosure. Other drawings may be obtained by those of ordinary skill in the art without any creative effort in accordance with these drawings.

DETAILED DESCRIPTION

The features and exemplary embodiments of various aspects of the present disclosure will be described in detail below. To make the objectives, technical solutions and advantages of the present application more apparent, the present application will be further described below in detail with reference to the drawings and embodiments. It should be understood that the specific embodiments described herein are only configured to explain the present application and are not configured to limit the present application. To those skilled in the art, the present application may be practiced without some of these specific details. The following description of the embodiments is merely intended to provide a better understanding of the present disclosure by illustrating examples of the present disclosure.

It should be noted that relational terms such as first, second and the like herein are only used to distinguish an entity or operation from another entity or operation, and do not require or imply these entities or operations have any such actual relationship or order. Moreover, the terms "comprise", "include" or any other variation thereof are intended to cover a non-exclusive inclusion, such that a process, a method, an article or a device that includes a series of elements includes not only those elements but also includes other elements that are not explicitly listed, or further includes elements inherent to such a process, method, article or device. In the case of no more limitation, the element defined by the phrase "include . . . " does not exclude that there are other same elements existing in the process, the method, the article or the device including the element.

It should be noted that the embodiments in the present application and the features in the embodiments can be combined with each other without conflict. The embodiments will be described in detail below with reference to the accompanying drawings.

Figure 1:
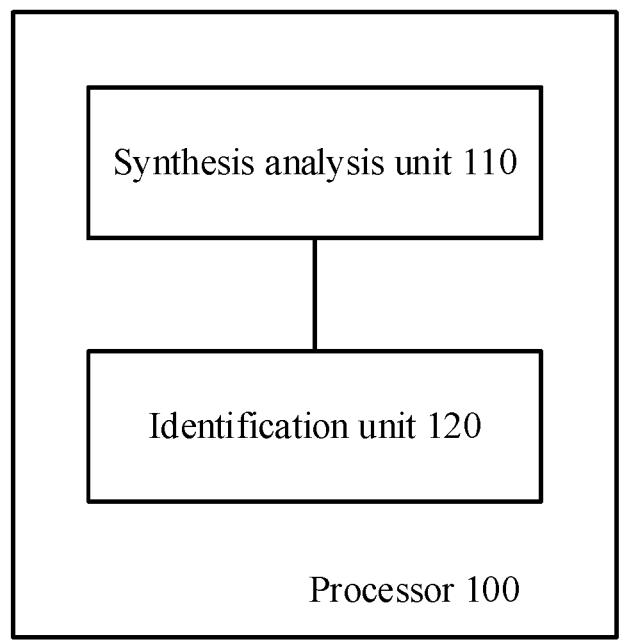
FIG. 1 is a schematic block diagram of a processor for train assistance tracking and early-warning according to an embodiment of the present disclosure.

FIG. 1 shows a schematic block diagram of a processor 100 for train assistance tracking and early-warning according to an embodiment of the present disclosure.

The processor 100 may include a synthesis analysis unit 110 and an identification unit 120.

The synthesis analysis unit 110 may be configured to perform a synthesis logic analysis on information ahead of a train based on a preset logic synthesis rule.

The identification unit 120 may be configured to identify an abnormal condition within a predetermined distance ahead of the train according to an analysis result, wherein the abnormal condition includes an appearance of any one or more of a signal machine, an obstacle, or a track turnout.

The information ahead of the train may include at least two types of the following information: information of multiple first images captured by a short-focus camera within a short-focus visibility distance ahead of the train, information of multiple second images captured by a long-focus camera within a predetermined distance ahead of the train, and information scanned by a laser radar within a predetermined distance ahead of the train. The short-focus visibility distance refers to a distance at which the short-focus camera can recognize a track outline. The predetermined distance is longer than the short-focus visibility distance.

It can be understood that, in the embodiment of the present disclosure, for example, the processor 100 may be a Traffic Collision Avoidance System (TCAS) host.

The information ahead of the train in the embodiment of the present disclosure may include a variety of information, such as the information of the first images captured by the short-focus camera, the information of the second images captured by the long-focus camera, and the information scanned by the laser radar. It should be noted that the first images captured by the short-focus camera are within the short-focus visibility distance ahead of the train, the second images captured by the long-focus camera are within the predetermined distance ahead of the train, and the information scanned by the laser radar is within the predetermined distance ahead of the train. For example, the short-focus camera captures images within 100 meters ahead of the train, the long-focus camera captures images within 270 meters ahead of the train, and the Laser radar scans information within 270 meters ahead of the train. In addition, both the track outline in the first images captured by the short-focus camera and the track outline in the second images captured by the long-focus camera are identified by using a deep learning method. In the embodiment of the present disclosure, the long-focus camera captures images at a relatively long distance and has a relatively low precision, while the short-focus camera captures images at a relatively short distance and has a relatively high precision.

In addition, according to the embodiment of the present disclosure, in a normal situation, the long-focus camera has a relatively long visibility distance, for example, in the case of a single track, the visibility distance can be up to 300 meters to 350 meters. However, such a long distance may not be needed when implementing train protection. For example, at a train speed of 80 km/h, according to a universal braking performance of the train, the safety protection can be achieved within about 270 meters. Therefore, when using the information of the images captured by the long-focus camera, it is not necessary to use the information of all the images within the long-focus visibility distance. It is sufficient to just use the information of the images within the predetermined distance. For example, the long-focus camera is able to capture the images within the distance of 350 meters, but in the embodiment, it is sufficient for the long-focus camera to just capture the images within the distance of 270 meters. In this way, the workload for processing the images can be reduced and the accuracy of subsequent synthesis can be increased. Accordingly, the predetermined distance herein refers to a distance at which the safety protection can be fully achieved by the train. For example, at the train speed of 80 km/h, according to the universal braking performance of the train, the predetermined distance may be 270 meters.

Further, since the laser radar scans above the ground plane, the track turnout cannot be identified. Also, since the laser radar cannot recognize a color of the signal machine, it may be impossible to use the laser radar to determine a change of the signal machine. Thus, the laser radar can only be applied to scan obstacles.

Then, in terms of determining obstacles, since the ranging accuracy of the laser radar is much higher than that of the images captured by the camera and the scanning frequency of the laser radar is very high, the use of the laser radar can ensure that all ranges within a predetermined distance can be scanned in a short time without wrong or missed scan. In addition, because the laser radar will be reflected back when being blocked and its speed is almost at the speed of light, the time that the laser radar takes to be reflected back within the predetermined distance is far less than 0.1 seconds. During the travelling of the train, the distance accuracy measured by the laser radar will be higher than that measured by the camera shooting, so a greater accuracy can be achieved by using the laser radar to scan obstacles.

In the embodiment of the present disclosure, an 80-line laser radar is generally used. By use of the 80-line laser radar, 80 targets can be tracked simultaneously.

With the processor 100 of the present disclosure, a synthesis logic analysis is performed on the information ahead of the train based on a preset logic synthesis rule, and then an abnormal condition within a predetermined distance ahead of the train can be identified based on the analysis result. Firstly, the short-focus camera can take the first images with a high accuracy, so the driver can be informed of the road conditions ahead accurately and the accuracy of identifying the road conditions ahead can be improved. Secondly, the long-focus camera can take the second images at a long distance, so it is possible to alert the driver in advance and thus provide sufficient reaction time for the driver. Thirdly, the laser radar with the high ranging accuracy facilitates to accurately determine the obstacles ahead. Therefore, with the combination of the three aspects, a timely alert can be provided to the driver and the effect of safety protection can be improved.

The following are two cases of the preset logic synthesis rule when the information ahead of the train includes merely the information of the multiple first images (referred to as "the first image information" herein for the sake of simplicity), the information of the multiple second images (referred to as "the second image information" herein for the sake of simplicity), and the scanned information.

In the first case, when an abnormal condition occurs in each of the first image information, the second image information, and the scanned information, the abnormal condition occurring in the scanned information is regarded as the abnormal condition within the predetermined distance ahead of the train.

In the second case, when only the first image information and the second image information have an abnormal condition and the scanned information does not have an abnormal condition, the abnormal condition occurring in the first image information is regarded as the abnormal condition within the predetermined distance ahead of the train.

It can be understood that if there is obstacle information in the scanned information, it can be determined that there is an obstacle ahead; and if there is no obstacle information in the scanned information, it can be determined that there is no obstacle ahead. For example, the scanned information from the laser radar indicates that there is an obstacle 80 meters ahead of the train, and the first image information and/or the second image information indicate that there is no obstacle ahead, or even the first image information and/or the second image information indicate that there is an obstacle 70 meters ahead of the train. In this case, it is finally determined that there is an obstacle 80 meters ahead of the train based on the scanned information. The obstacles to be scanned by the laser radar can also include some barriers, such as corners, tunnels, and so on.

In another embodiment, in addition to the information of the multiple first images, the information of the multiple second images, and the scanned information, the information ahead of the train may further include positioning information within the predetermined distance ahead of the train.

It should be noted that the positioning in the present embodiment mainly determines position information of the track turnout and/or the signal machine currently ahead of the train based on some previously stored position information of the track turnout and/or the signal machine.

The following are two cases of the preset logic synthesis rule when the information ahead of the train includes the first image information, the second image information, the scanned information, and the positioning information.

In the first case, when an abnormal condition occurs in each of the first image information, the second image information, the scanned information and the positioning information, the abnormal conditions occurring in the scanned information and the positioning information are regarded as the abnormal conditions within the predetermined distance ahead of the train.

In the second case, when only the first image information, the second image information and the scanned information have an abnormal condition and the positioning information does not have an abnormal condition, the abnormal condition occurring in the scanned information is regarded as the abnormal condition within the predetermined distance ahead of the train.

In the embodiment of the present disclosure, firstly the short-focus camera can take the first images with a high accuracy, so the driver can be informed of the road conditions ahead accurately and the accuracy of identifying the road conditions ahead can be improved; secondly, the long-focus camera can take the second images at a long distance, so it is possible to alert the driver in advance and thus provide sufficient reaction time for the driver; and thirdly, the laser radar with the high ranging accuracy facilitates to accurately determine the obstacles ahead. In addition to the above three types of information, the positioning information is further used to undoubtedly determine the position information of the track turnout and the signal machine that appear ahead of the train. As a result, the error rate of identifying the abnormal condition ahead can be significantly decreased, and thus the effect of safety protection can be greatly improved.

An early-warning system according to an embodiment of the present disclosure will be described in detail below with reference to FIG. 2 to FIG. 7.

Figure 2:
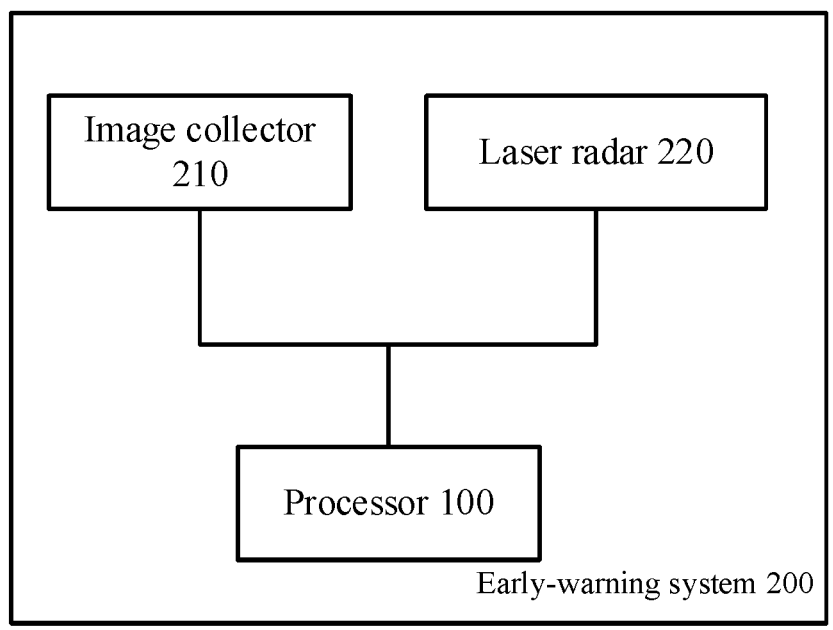
FIG. 2 is a schematic block diagram of a train assistance tracking and early-warning system according to an embodiment of the present disclosure.

FIG. 2 shows a schematic block diagram of a train assistance tracking and early-warning system 200 according to another embodiment of the present disclosure. As shown in FIG. 2, the early-warning system 200 includes an image collector 210, a laser radar 220 and a processor 100 of the above embodiment that are disposed on the train;

The image collector 210 is configured to collect information of multiple first images within a short-focus visibility distance ahead of the train and collect information of multiple second images within a predetermined distance ahead of the train, wherein the short-focus visibility distance refers to a distance at which a short-focus camera can recognize a track outline and the predetermined distance is longer than the short-focus visibility distance.

The laser radar 220 is configured to collect scanned information within the predetermined distance ahead of the train;

The processor 100 is configured to perform a synthesis logic analysis on the information of each first image, the information of each second image, and the scanned information based on a preset logic synthesis rule, and identify an abnormal condition within the predetermined distance ahead of the train based on the analysis result.

It can be understood that in the embodiment of the present disclosure, the image collector 210 includes a short-focus camera 2101 and a long-focus camera 2102, wherein the short-focus camera 2101 captures the first image information within the short-focus visibility distance ahead of the train and the long-focus camera 2102 captures the second image information within the predetermined distance ahead of the train. The laser radar 220 collects the scanned information within the predetermined distance ahead of the train.

In the early-warning system 200, the first image information and the second image information are respectively collected by the short-focus camera 2101 and the long-focus camera 2102 and preprocessed. The preprocessing is mainly to analyze and process the first image information and the second image information respectively. Specifically, the first image information is analyzed to determine whether the first image information contains abnormal information such as the obstacle information, the signal machine information, or the track turnout information and then the abnormal information is recorded. Likewise, the second image information is analyzed to determine whether the second image information contains abnormal information such as the obstacle information, the signal machine information, or the track turnout information and then the abnormal information is recorded.

Finally, the recorded abnormality information is sent to the processor 100, so that the processor 100 can perform direction latch associated with the signal machine and visibility preprocessing according to the first image information and the second image information. After the preprocessing, the synthesis logic analysis is performed on the information of each first image, the information of each second image, and the scanned information based on the preset logic synthesis rule, and the abnormal condition within the predetermined distance ahead of the train is identified based on the analysis result.

The following is a further explanation of the direction latch associated with the signal machine and the visibility preprocessing.

Firstly, it may be analyzed whether the information of each first image, the information of each second image, and the scanned information contain the abnormal information. The abnormal information includes one or more of the obstacle information, the track turnout information, or the signal machine information. Then, when the signal machine information appears, the current signal machine information may be recorded respectively. The current signal machine information will not change until a next signal machine shows an abnormal color.

In the embodiment of the present disclosure, direction information of the train may be latched in accordance with the color of the signal machine. Particularly, the direction information may be latched when it is determined that the signal machine information appears. Generally, when the train passes the current signal machine, the color of the current signal machine may be latched. For example, assuming that the color of the current signal machine is green, then the color of the current signal machine is recorded as green for a certain period of time. When the train travels to a next signal machine and the next signal machine appears in other colors (e.g. yellow or red) but not green, the currently recorded color information of the signal machine may be changed. Alternatively, if there is no signal machine in the captured images for a certain period of time after the signal machine is present in the image currently captured by the camera, it may be assumed that the captured images contain a signal machine having a same color as the previously present signal machine. For example, the current signal machine is green, and there is no signal machine for a certain period of time. In this case, the color information of the signal machine is kept as green, and will not be updated to a color of a new signal machine until the new signal machine appears in a newly captured image and has a color other than green. This is to avoid failing to capture a signal machine due to instability of the image shooting or because of the signal machine in front of the turnout first disappearing from the image to be captured when the train passes by the turnout. For example, when the train passes by the turnout, the signal machine first enters a blind area of the camera, causing the camera fails to capture the signal machine. However, at this time, the train may not pass through the signal machine and the turnout, and the train needs to select the direction of the turnout or determine a distance according to the color of the signal machine. So it may be necessary to record the current signal machine information, i.e., keep the recorded signal machine information is still the current signal information.

Therefore, through the direction latch in the embodiment of the present disclosure, it is possible to avoid the blind area of the image shooting and identify all the road conditions.

The visibility preprocessing is to preprocess a safety distance, i.e., determine the safety distance based on the color of the signal machine. As an example, when the signal machine appears in the image taken by the short-focus camera and the color of the signal machine is red, it is necessary to determine the safety distance according to the current status of the short-focus camera.

For example, assuming that there is currently a single track and the signal machine is green, it shows that the road ahead is safe to go straight, and thus the safety distance determined by the short-focus camera is the short-focus visibility distance, e.g., if the short-focus visibility distance is 100 meters, then the safety distance is 100 meters. The safety distance determined by the long-focus camera is the predetermined distance of 300 meters.

For example, when there is currently a single track and the signal machine is red, the safety distance determined according to the image information captured by the short-focus camera is the distance from the train to the signal machine. Assuming that the signal machine 100 meters ahead of the short-focus camera is red, then the safety distance determined by the short-focus camera is 100 meters. Likewise, assuming that the signal machine 250 meters ahead of the long-focus camera is red, then the safety distance determined by the long-focus camera is 250 meters. However, when there is currently a track turnout, then it may be needed to determine the safety distance according to the color of the signal machine beside the track turnout. If the color of the signal machine is yellow, it indicates that the track turnout is in a switch position. If the color of the signal machine is green, it indicates that the track turnout is in a normal position. If the color of the signal machine is green, then the safety distance may be determined as a distance from the train to a center of a track turnout or the short-focus visibility distance depending on different track turnouts.

It should be noted that, in the embodiment of the present disclosure, the track turnout being in the normal position means that the train travels along a fixed line, and the track turnout being in the switch position means that the train does not travel along the fixed line.

With the early-warning system 200 of the present disclosure, a synthesis logic analysis is performed on the information ahead of the train based on a preset logic synthesis rule, and then an abnormal condition within a predetermined distance ahead of the train can be identified based on the analysis result. Firstly, the short-focus camera can take the first images with a high accuracy, so the driver can be informed of the road conditions ahead accurately and the accuracy of identifying the road conditions ahead can be improved. Secondly, the long-focus camera can take the second images at a long distance, so it is possible to alert the driver in advance and thus provide sufficient reaction time for the driver. Thirdly, the laser radar with the high ranging accuracy facilitates to accurately determine the obstacles ahead. Therefore, with the combination of the three aspects, a timely alert can be provided to the driver and the effect of safety protection can be improved.

Figure 3:
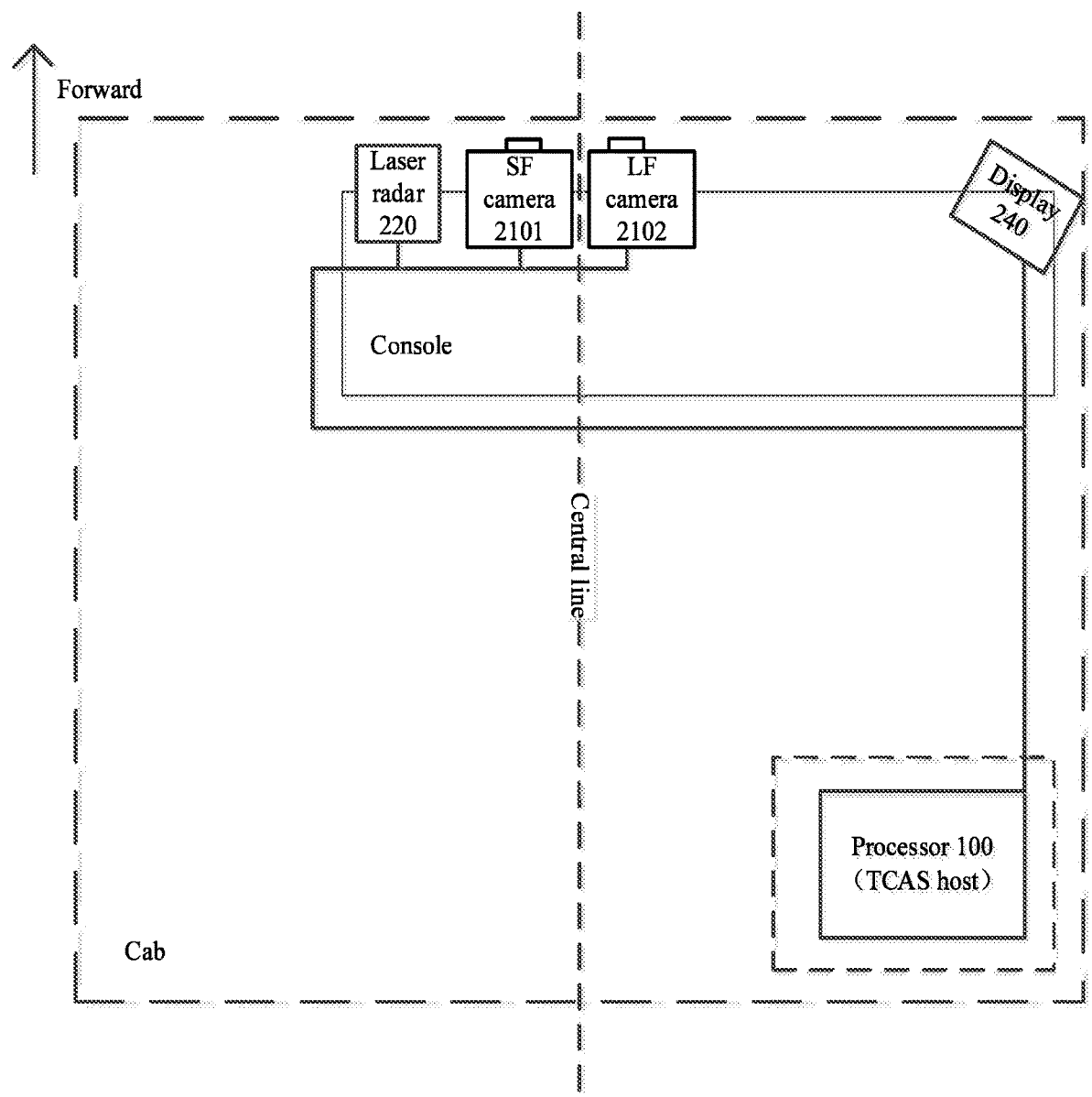
FIG. 3 is a schematic diagram of an actual scene of a train assistance tracking and early-warning system according to an embodiment of the present disclosure.

FIG. 3 is a schematic diagram showing an installation of an early-warning system in a driver's cab according to an embodiment of the present disclosure.

The early-warning system 200 may also include a camera device 230 and a display 240.

The camera device 230 is configured to collect eye information of the driver and send the collected result to the processor.

The processor 100 is further configured to make a determination about the collected result. When a driver's eye blinking frequency is greater than a default blinking frequency threshold, and an eye-closed time is greater than a default eye-closed time threshold, a corresponding alarm information is sent to the display 240;

The display 240 is configured to send an alert message to the driver in accordance with the alarm information.

The display 240 is also used to display the abnormal condition within the predetermined distance ahead of the train and display the alert message corresponding to the abnormal condition.

As shown in FIG. 3, the laser radar 220, the short-focus camera 2101, and the long-focus camera 2102 are all disposed in front of a bridge, and the display 240 is disposed on the right side of the bridge so that the driver can clearly view the alert message through the display 240. The processor 100 (TCAS host) is installed at the rear of the cab. In addition to processing the first image information, the second image information, and the scanned information, the processor 100 also processes the driver's eye information transmitted by the camera device 230, and determines the driver's eye blinking frequency and the eye closed time. When the driver is fatigued, the driver's eye blinking frequency will be decreased, and the eye closed time will become longer. For example, during normal driving, the driver's eye blinking frequency may be 10 times per minute, and the eye closed time may be 2 seconds each time. When the driver is fatigued, the driver's eye blinking frequency may be 3 times per minute and the eye closed time may be 30 seconds each time.

Optionally, in another embodiment, the early-warning system 200 may further include a dispatch center device 250.

The dispatch center device 250 is configured to send out an alert message in accordance with the alarm information sent by the processor 100, so as to remind changing the driver at the next station.

Figure 4:
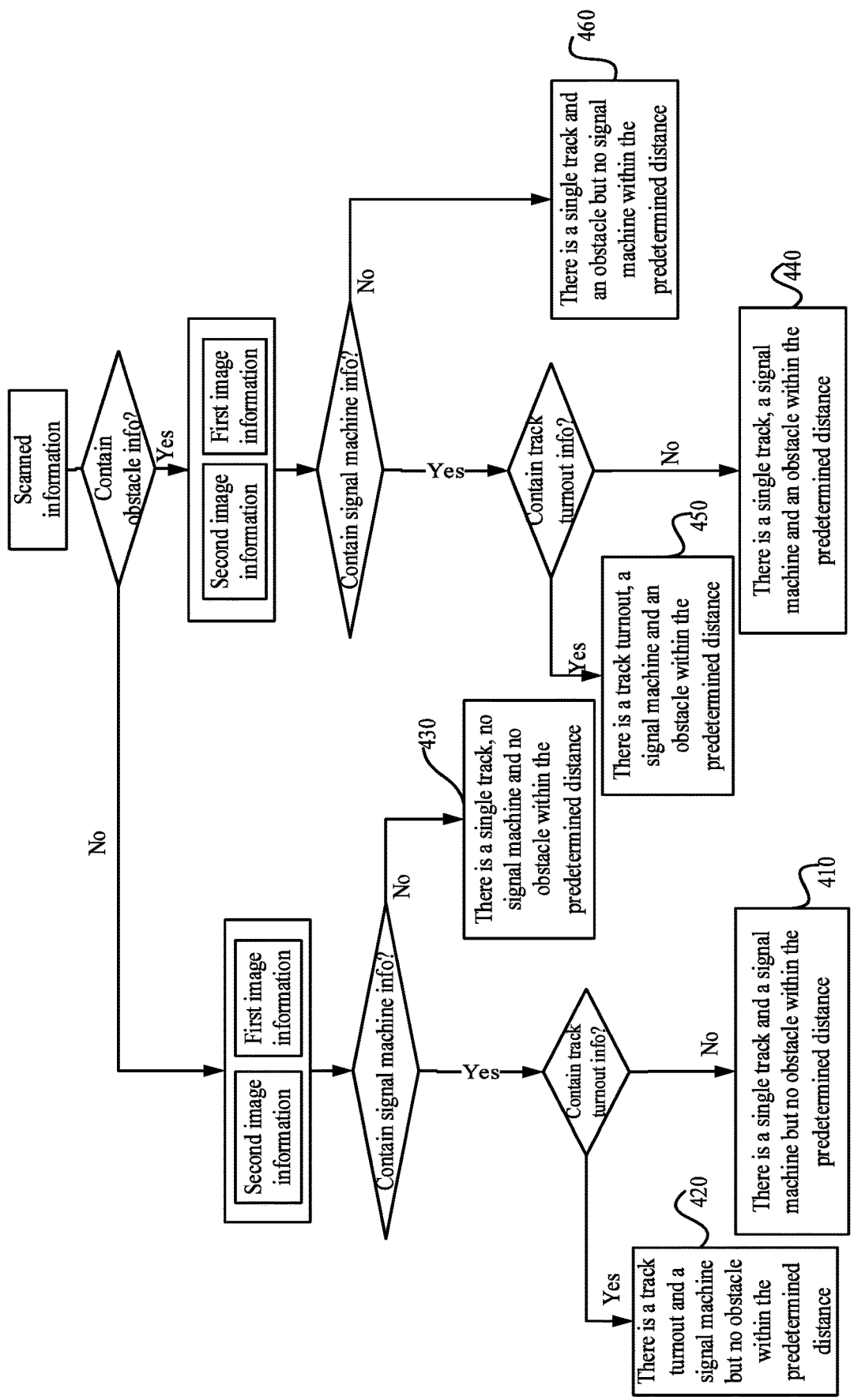
FIG. 4 is a schematic diagram of identifying an obstacle, a signal machine, and a track turnout according to an embodiment of the present disclosure.

Optionally, an explanation of the processor 100 is given below. The processor 100 may include an identification unit 101. FIG. 4 is a schematic diagram of an identification of an obstacle, a signal machine, and a track turnout based on image information according to another embodiment of the present disclosure. It may be identified whether there is a single track, a track turnout, a signal machine, or an obstacle. Specifically, the identification may be based on the scanned information, the first image information, the second image information, and the track turnout information.

The operations performed by the identification unit 101 will be explained by considering the following six cases.

In the first case, at 410, when the scanned information is normal and the first image information and/or the second image information only contain the signal machine information, it is determined that there is a single track and a signal machine but no obstacle within the predetermined distance ahead of the train.

In the embodiment of the present disclosure, after the preprocessing analysis, the image information captured by the short-focus camera and the image information captured by the long-focus camera are synthetically processed. When the scanned information is normal and the image information captured by the short-focus camera and/or the image information captured by the long-focus camera only contain the signal machine information but no track turnout information and obstacle information, it can be identified that there is a single track and a signal machine within a predetermined distance ahead of the train.

If the image information captured by the short-focus camera contains the signal machine information, then it means that there is a single track within the visibility distance of the short-focus camera and there is a signal machine; if the image information captured by the short-focus camera does not contain the signal machine information but the image information captured by the long-focus camera contains the signal machine information, then it means that there is no signal machine within the short-focus visibility distance but there must be a signal machine within the predetermined distance.

For example, when the first image information captured by the short-focus camera indicates that there is a signal light within 50 meters ahead of the train, it can be determined that there is a signal light within 50 meters ahead of the current train. If the first image information captured by the short-focus camera indicates that there is no signal machine information within 100 meters ahead of the train but the second image information captured by the long-focus camera indicates that there is the signal machine information within 200 meters ahead of the train, then it means that there is no signal machine within 100 meters ahead of the train but there is a signal machine within 200 meters ahead of the train.

In the second case, at 420, when the scanned information is normal and the first image information and/or the second image information only contain the track turnout information and the signal machine information, it is determined that there is a track turnout and a signal machine but no obstacle within the predetermined distance ahead of the train.

It can be understood that in the embodiment of the present disclosure, the normal scan information indicates that there is no obstacle. When both the first image information captured by the short-focus camera and the second image information captured by the long-focus camera contain the track turnout information and the signal machine information, it is determined that there is a track turnout and a signal machine within the short-focus visibility distance. For example, the image information captured by the short-focus camera indicates that there is a track turnout and a signal machine within 50 meters ahead, and the image information captured by the long-focus camera indicates that there is a track switch and a signal machine within 60 meters ahead. In this case, it is determined that there is a track turnout and a signal machine within the short-focus visibility distance of 50 meters.

In addition, it should be noted that there must be a signal machine when a track turnout appears, but there may not be a track turnout when a signal machine appears. The reason is that it is generally necessary to place the signal machine next to the track turnout in order to remind the driver to drive towards the normal or switch position of the turnout. If the first image information captured by the short-focus camera does not contain the track turnout information and the signal machine information but the second image information captured by the long-focus camera contains the track turnout information and the signal machine information, it may be determined that there is the track turnout information and the signal machine information within the predetermined distance. For example, the first image information captured by the short-focus camera indicates that there is no track turnout and signal machine within 50 meters ahead, but the image information captured by the long-focus camera indicates that there is a track switch and a signal machine within 150 meters ahead. In this case, it may be determined that there is a track turnout and a signal machine within the predetermined distance of 150 meters.

In the third case, at 430, when the scanned information, the first image information, and the second image information are all normal, it may be determined that there is a single track, but no signal machine and obstacle within the predetermined distance ahead of the train.

In the fourth case, at 440, when the scanned information contains the obstacle information, and the first image information and/or the second image information contain merely the signal machine information, it may be determined that there is a single track, a signal machine and an obstacle within the predetermined distance ahead of the train.

For example, when the scanned information contains the obstacle information, it may be determined that there is an obstacle. If the first image information captured by the short-focus camera and/or the second image information captured by the long-focus camera contain the signal machine information, it may be determined that there is a signal machine. But the signal machine may be in front of the obstacle; or the signal machine may be behind the obstacle. For example, the signal machine may be 50 meters ahead of the train and the obstacle may be 80 meters ahead of the train; or the obstacle may be 80 meters ahead of the train and the signal machine may be 150 meters ahead of the train; or the signal machine may be 120 meters ahead of the train and the obstacle may be 150 meters ahead of the train.

In the fifth case, at 450, when the scanned information contains the obstacle information, and the first image information and/or the second image information contain merely the track turnout information and the signal machine information, it may be determined that there is a track turnout, a signal machine and an obstacle within the predetermined distance ahead of the train.

For example, when the scanned information contains the obstacle information, it may be determined that there is an obstacle. If the first image information captured by the short-focus camera and/or the second image information captured by the long-focus camera contain the track turnout information and the signal machine information, it may be determined that there is a track turnout and a signal machine. But the signal machine and the track turnout may be in front of the obstacle; or the signal machine and the track turnout may be behind the obstacle. For example, the signal machine and the track turnout may be 50 meters ahead of the train and the obstacle may be 80 meters ahead of the train; or the obstacle may be 80 meters ahead of the train and the signal machine and the track turnout may be 150 meters ahead of the train; or the signal machine and the track turnout may be 120 meters ahead of the train and the obstacle may be 150 meters ahead of the train.

In the sixth case, at 460, when the scanned information contains the obstacle information, and both the first image information and the second image information are normal, it may be determined that there is a single track and an obstacle but no signal machine within the predetermined distance ahead of the train.

In the embodiment of the present disclosure, the safety protection of the train is improved by performing the identification with the combination of the short-focus camera, the long-focus camera, and the laser radar.

Optionally, the processor 100 may further include an operating unit 102. Three different ways in which the operating unit 102 operates are described below.

In the first way, when the scanned information contains the obstacle information and the first image information and/or the second image information contain only the signal machine information having color abnormal information, a first distance between the obstacle and the train and a second distance between the signal machine and the train may be determined, a first safety distance may be determined as a shorter distance between the first distance and the second distance, and a corresponding first safety alert signal may be sent out based on the color abnormal information and the first safety distance.

For example, in the embodiment of the present disclosure, there may be an obstacle 100 meters (i.e. the first distance) ahead of the train and a signal machine of a red color 150 meters (i.e. the second distance) ahead of the train. In this case, the first safety distance can be determined as 100 meters which is the distance from the train to the obstacle. As another example, if there is a signal machine 100 meters ahead of the train and an obstacle 150 meters ahead of the train, the first safety distance can be determined as 100 meters which is the distance from the train to the signal machine.

In the second way, when the scanned information contains the obstacle information and the first image information and/or the second image information contain only the track turnout information and the signal machine information having color abnormal information, a first distance between the obstacle and the train and a second distance between the signal machine and the train may be determined, a second safety distance in the direction of the switch position of the track turnout may be determined as a shorter distance between the first distance and the second distance, and a corresponding second safety alert signal may be sent out based on a first color abnormal information in the color abnormal information and the second safety distance.

It can be understood that in the embodiment of the present disclosure, there may be an obstacle appearing after the track turnout. For example, there may be a track turnout 100 meters ahead of the train and an obstacle 150 meters ahead of the train. In this case, when the signal machine at the track turnout is red or yellow, the train needs to stop or go towards the switch position of the track turnout, and the second safety distance can be determined as 100 meters which is the distance from the signal machine to the train. Alternatively, there may be an obstacle appearing before the track turnout. For example, when there is an obstacle 100 meters ahead of the train and a track turnout 150 meters ahead of the train, the second safety distance can be determined as 100 meters which is the distance from the obstacle to the train.

In the third way, when the scanned information is normal and the first image information and/or the second image information contain only the track turnout information and normal signal machine information, a third safety distance can be determined as the short-focus visibility distance, or the third safety distance can be determined as the distance from the train to the center of the track turnout. Then a corresponding third safety alert signal may be sent out based on the third safety distance.

It can be understood that, in the embodiment of the present disclosure, if there is no obstacle and the signal machine is currently green, then it indicates that the road ahead is safe for the train to go straight, that is, the short-focus visibility distance or the distance from the train to the center of the track turnout is the third safety distance.

Figure 5:
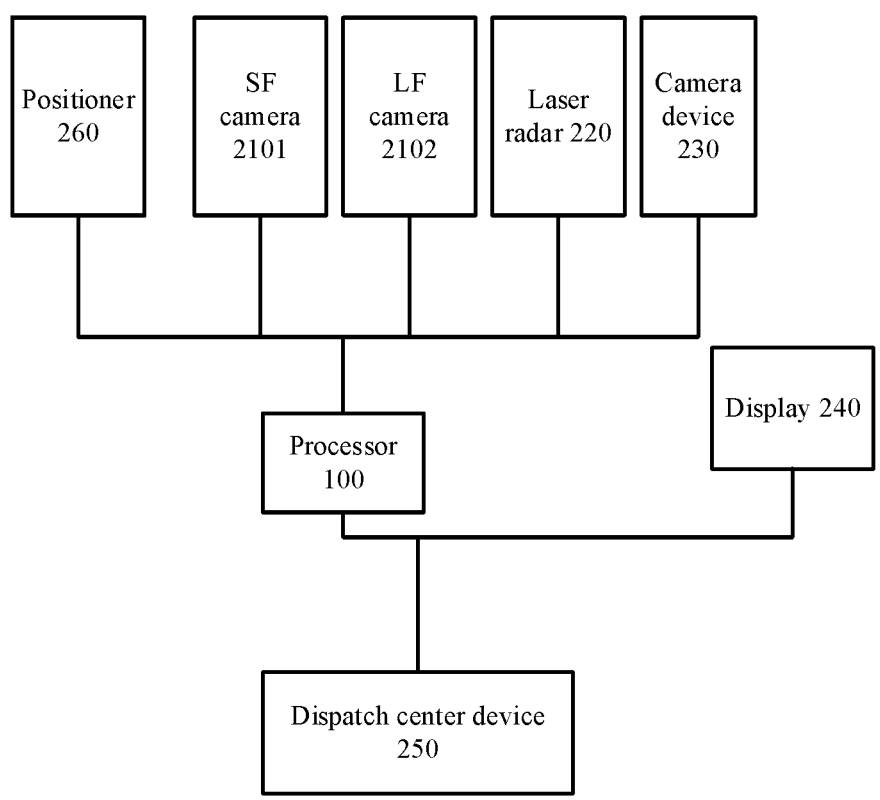
FIG. 5 is a schematic block diagram of a train assistance tracking and early-warning system according to another embodiment of the present disclosure.

In another embodiment, as shown in FIG. 5, an early-warning system 200 including a positioner 260 is provided according to another embodiment of the present disclosure.

The positioner 260 is used to determine positioning information within the predetermined distance ahead of the train. Given the positioning information, the processor 100 may be configured to perform a synthesis logic analysis on the first image information, the second image information, the scanned information, and the positioning information based on the preset logic synthesis rule, and identify the abnormal condition within the predetermined distance ahead of the train according to the analysis result.

Figure 6:
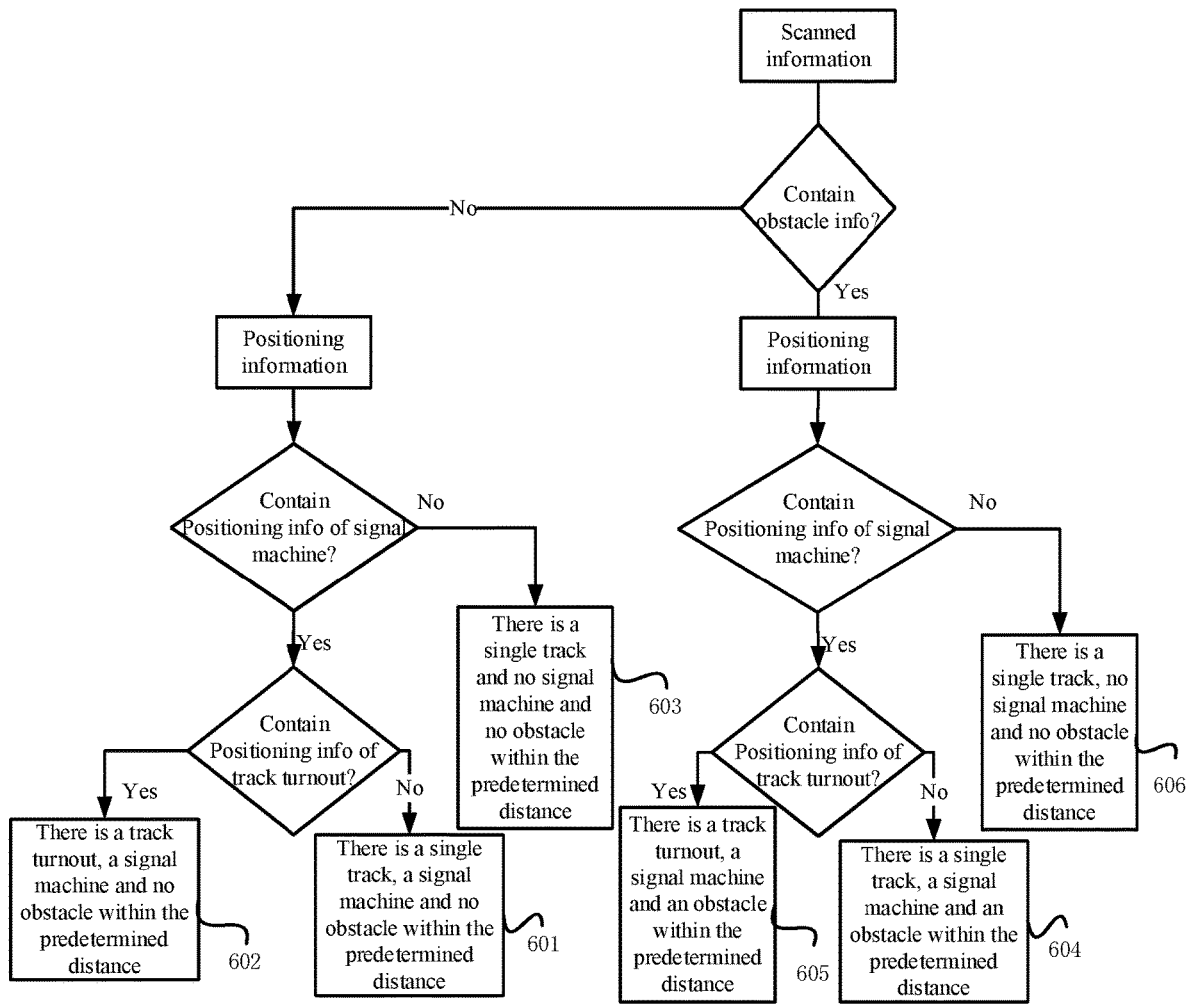
FIG. 6 is a schematic diagram of identifying a track turnout and a signal machine with positioning information according to another embodiment of the present disclosure.

Alternatively, given the positioning information, the identification unit 101 may operate in the following six different cases. FIG. 6 is a schematic diagram of identifying a track turnout and a signal machine with positioning information according to another embodiment of the present disclosure. Specifically, the identification of the single track, the track turnout, the signal machine and the obstacle may be performed based on the positioning information, the scanned information, the first image information, the second image information, and the track turnout information.

In the first case, at 601, when the scanned information is normal and the positioning information only contains the positioning information of a signal machine, it may be determined that there is a single track, a signal machine but no obstacle within the predetermined distance ahead of the train.

It can be understood that the normal scanned information indicates that there is no obstacle, the positioning information containing only the positioning information of the signal machine indicates that there is only the signal machine, and no track turnout indicates that there is the single track, the signal machine but no obstacle ahead of the train.

In the second case, at 602, when the scanned information is normal and the positioning information contains the positioning information of a signal machine and a track turnout, it may be determined that there is a track turnout, a signal machine but no obstacle within the predetermined distance ahead of the train.

It can be understood that the normal scanned information indicates that there is no obstacle, the positioning information containing the positioning information of the signal machine and the track turnout indicates that there is the signal machine and the track turnout ahead.

In the third case, at 603, when both the scanned information and the positioning information are normal, it may be determined that there is a single track but no signal machine and obstacle within the predetermined distance ahead of the train.

It can be understood that both the scanned information and the positioning information being normal indicates that there is none of the track turnout, the signal machine, and the obstacle.

In the fourth case, at 604, when the scanned information contains the obstacle information and the positioning information only contains the positioning information of a signal machine, it may be determined that there is a single track, a signal machine and an obstacle within the predetermined distance ahead of the train.

It can be understood that the scanned information containing the obstacle information indicates that there is an obstacle ahead of the train, and the positioning information containing only the positioning information of the signal machine indicates that there is a signal machine ahead.

In the fifth case, at 605, when the scanned information contains the obstacle information and the positioning information contains the positioning information of a signal machine and a track turnout, it may be determined that there is a track turnout, a signal machine and an obstacle within the predetermined distance ahead of the train.

In the sixth case, at 606, when the scanned information contains the obstacle information and the positioning information is normal, it may be determined that there is a single track, an obstacle but no signal machine within the predetermined distance ahead of the train.

Given the positioning information, the operating unit 102 may perform further operations to determine the safety distance in three ways as follows.

In the first way, when the scanned information contains the obstacle information, the positioning information contains only the positioning information of the signal machine and the first image information and/or the second image information contain the signal machine information having color abnormal information, a first distance between the obstacle and the train and a second distance between the signal machine and the train may be determined, a first safety distance may be determined as a shorter distance between the first distance and the second distance, and a corresponding first safety alert signal may be sent out based on the first safety distance.

It can be understood that the scanned information containing the obstacle information indicates that there is an obstacle ahead of the train, and the positioning information containing only the positioning information of the signal machine indicates that there is a signal machine ahead. When the first image information and/or the second image information contain the signal machine information having the color abnormal information, it indicates that the color of the signal machine is red or yellow. For example, in the embodiment of the present disclosure, there may be an obstacle 100 meters (i.e. the first distance) ahead of the train and a signal machine of a red color 150 meters (i.e. the second distance) ahead of the train. In this case, the first safety distance can be determined as 100 meters which is the distance from the train to the obstacle. As another example, if there is a signal machine 100 meters ahead of the train and an obstacle 150 meters ahead of the train, the first safety distance can be determined as 100 meters which is the distance from the train to the signal machine.

In the second way, when the scanned information contains the obstacle information, the positioning information contains the positioning information of the signal machine and the track turnout and the first image information and/or the second image information contain the signal machine information having color abnormal information, a first distance between the obstacle and the train and a second distance between the signal machine and the train may be determined, a second safety distance in the direction of the switch position of the track turnout may be determined as a shorter distance between the first distance and the second distance, and a corresponding second safety alert signal may be sent out based on a first color abnormal information in the color abnormal information and the second safety distance.

It can be understood that in the embodiment of the present disclosure, there may be an obstacle appearing after the track turnout. For example, there may be a track turnout 100 meters ahead of the train and an obstacle 150 meters ahead of the train. In this case, when the signal machine at the track turnout is red or yellow, the train needs to stop or go towards the switch position of the track turnout, and the second safety distance can be determined as 100 meters which is the distance from the signal machine to the train. Alternatively, there may be an obstacle appearing before the track turnout. For example, when there is an obstacle 100 meters ahead of the train and a track turnout 150 meters ahead of the train, the second safety distance can be determined as 100 meters which is the distance from the obstacle to the train.

In the third way, when the scanned information is normal, the positioning information contains the positioning information of the signal machine and the track turnout and the first image information and/or the second image information contain normal signal machine information, a third safety distance can be determined as the short-focus visibility distance, or the third safety distance can be determined as the distance from the train to the center of the track turnout. Then a corresponding third safety alert signal may be sent out based on the third safety distance.

It can be understood that, in the embodiment of the present disclosure, if there is no obstacle and the signal machine is currently green, then it indicates that the road ahead is safe for the train to go straight, that is, the short-focus visibility distance or the distance from the center of the track turnout is the third safety distance.

According to the above-described embodiments, the short-focus camera, the long-focus camera, the laser radar, and the map positioning are to be used. Using the map positioning, it is possible to determine whether there is a signal machine or a track turnout ahead very accurately, and there is no risk of image errors or scanning errors. In addition, according to the images captured by the long-focus camera, the driver can be reminded in advance to give the driver sufficient response time and thus reduce the risk of unresponsiveness. Also, the information scanned by the laser radar can be used to accurately determine the distance to the obstacle ahead and provide the driver with accurate distance information, so that the driver can make corresponding operations according to the distance information and the effect of safety protection can be improved. At the same time, according to the images taken by the short-focus camera, the road conditions ahead of the driver can be shown to the driver more clearly, and the accuracy of identifying the road conditions ahead can be increased.

Figure 7:
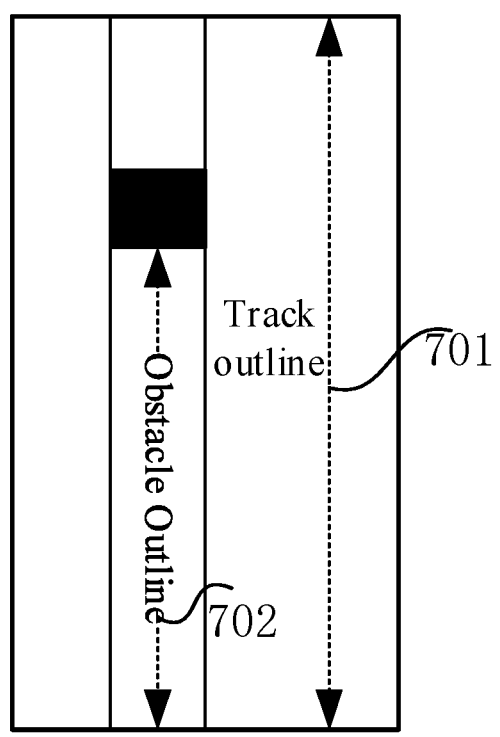
FIG. 7 is a schematic diagram of identifying an obstacle with a track outline according to an embodiment of the present disclosure.

For all of the foregoing embodiments, as shown in FIG. 7, it should be further noted that the obstacle information may include at least one of the following information: information indicating that a length of a track outline in an image is less than the short-focus visibility distance and information indicating that the length of the track outline is less than the predetermined distance.

It can be understood that when the obstacle is a vehicle, the obstacle can directly be determined as the vehicle by the way of deep learning. But if the obstacle is some other item, it may be necessary to make the determination according to the obstacle outline in the image. For example, assuming the visibility of a short-focus image is 100 meters, if there is no obstacle, the continuous track outline is 100 meters; but if there is an obstacle on the track, then the track outline in the image taken by the short-focus camera or in the image taken by the long-focus camera will be blocked and thus the continuous track outline is less than 100 meters. With reference to FIG. 7, the continuous track outline 701 and the obstacle outline 702 are illustrated.

The following is an explanation of the signal machine information and the track turnout information as mentioned in the foregoing embodiments.

The signal machine information may include:

1. Color of the signal machine (0: no light, 01: green light, 02: yellow light, 03: red light);

2. Identifier (id) of the signal machine (Number); and

3. Position information of the signal machine (01 means the signal machine is on the left side of the track, and 02 means the signal machine is on the right side of the track).

The track turnout information may include:

4. The distance to the heart (i.e. intersection point) of the track turnout;

5. Identifier (id) of the track turnout (Number);

6. The track line is a single track (1: a single track without a track turnout), a normal position path (3: a track turnout with a straight position), or a switch position path (2: a track turnout with a switch position); and 7. An obstacle at the end of the track line is a train or not (0X55: Yes, 0XAA: No).

It should be understood that the present application is not limited to the specific configurations and processes described above and shown in the figures. For the sake of conciseness, a detailed description of known methods is omitted here. In the above described embodiments, several specific steps have been described and illustrated as examples. However, the process in the present disclosure is not limited to the described and illustrated specific steps, and those skilled in the art can make various changes, modifications, and additions or change the order between steps after understanding the spirit of the present disclosure.

The functional blocks shown in the block diagrams described above may be implemented as hardware, software, firmware, or a combination thereof. When implemented in hardware, it may be, for example, an electronic circuit, an application specific integrated circuit (ASIC), a suitable firmware, a plug-in, a function card, and the like. When implemented in software, the elements of the present disclosure are programs or code segments that are used to perform the required tasks. The programs or code segments may be stored on a machine-readable medium or transmitted over a transmission medium or communication link via a data signal carried in a carrier wave. The "machine-readable medium" may include any medium that is capable of storing or transmitting information. Examples of machine-readable media include an electronic circuitry, a semiconductor memory device, a ROM, a flash memory, an erasable ROM (EROM), a floppy disk, a CD-ROM, an optical disk, a hard disks, fiber optic media, a radio frequency (RF) link, and the like. The code segments may be downloaded via a computer network such as the Internet, an intranet or the like.

It should also be noted that the exemplary embodiments mentioned in the present disclosure describe some methods or systems based on a series of steps or devices. However, the present application is not limited to the order of the above steps, that is, the steps may be performed in the order mentioned in the embodiments, or may be different from the order in the embodiment, or several steps may be simultaneously performed.

The foregoing descriptions are merely specific implementations of the present disclosure. Those skilled in the art can clearly understand that, for the convenience and conciseness of the description, the specific working processes of the above-described systems, modules and units may refer to the foregoing method embodiments. The corresponding process in this article is not described here. It should be understood that the scope of protection of the present disclosure is not limited thereto, and any person skilled in the art can easily conceive various equivalent modifications or replacements within the technical scope disclosed by the present disclosure, and these modifications or replacements should be covered within the scope of the present application.

What is claimed is:

1. A device for train assistance tracking and early-warning, comprising:

an information transmission interface, and a processor coupled to the information transmission interface, wherein:

the processor is configured to;

perform a synthesis logic analysis on information ahead of a train based on a preset logic synthesis rule, the information ahead of the train being acquired via the information transmission interface; and identify an abnormal condition within a predetermined distance ahead of the train according to an analysis result, wherein the abnormal condition includes an appearance of any one or more of a signal machine, an obstacle, or a track turnout, and the information transmission interface is coupled to a short-focus camera, a long-focus camera and a laser radar that are disposed in the train, and the information transmission interface is configured to acquire the information ahead of the train comprising at least two types of the following information: first image information within a short-focus visibility distance ahead of the train captured by the short-focus camera, second image information within the predetermined distance ahead of the train captured by the long-focus camera, and information within the predetermined distance ahead of the train scanned by the laser radar, wherein the short-focus visibility distance is a distance at which the short-focus camera is able to identify a track outline, and the predetermined distance is longer than the short-focus visibility distance.

2. The device of claim 1, wherein when the information ahead of the train comprises the first image information, the second image information and the scanned information, the preset logic synthesis rule comprises:

when each of the first image information, the second image information, and the scanned information contains the abnormal condition, the abnormal condition in the scanned information is regarded as the abnormal condition within the predetermined distance ahead of the train; or when only the first image information and the second image information contain the abnormal condition and the scanned information does not contain the abnormal condition, the abnormal condition in the first image information is regarded as the abnormal condition within the predetermined distance ahead of the train.

3. The device of claim 1, wherein the information ahead of the train further comprises a positioning information within the predetermined distance ahead of the train.

4. The device of claim 3, wherein when the information ahead of the train comprises the first image information, the second image information, the scanned information and the positioning information, the preset logic synthesis rule comprises:

when each of the first image information, the second image information, the scanned information and the positioning information contains the abnormal condition, the abnormal condition in the scanned information and the positioning information is regarded as the abnormal condition within the predetermined distance ahead of the train; or when only the first image information, the second image information and the scanned information contains the abnormal condition and the positioning information does not contain the abnormal condition, the abnormal condition in the scanned information is regarded as the abnormal condition within the predetermined distance ahead of the train.

5. A system for train assistance tracking and early-warning, comprising the short-focus camera, the long-focus camera, the laser radar and the device of claim 1 that are disposed in the train, wherein:
the short-focus camera is configured to collect the first image information within the short-focus visibility distance ahead of the train,
the long-focus camera is configured to collect the second image information within the predetermined distance ahead of the train;
the laser radar is configured to collect the scanned information within the predetermined distance ahead of the train; and
the processor is configured to perform the synthesis logic analysis on the first image information, the second image information, and the scanned information based on the preset logic synthesis rule, and identify the abnormal condition within the predetermined distance ahead of the train based on the analysis result.

6. The system of claim 5, further comprising a camera device and a display, wherein: the camera device is configured to collect eye information of a driver and send the collected eye information to the processor;
the processor is further configured to make a determination about the collected eye information and send a corresponding alarm information to the display when an eye blinking frequency of the driver is greater than a preset blinking frequency threshold and an eye-closed time is greater than a preset eye-closed time threshold;
the display is configured to send an alert message to the driver in accordance with the alarm information; and
the display is further configured to display the abnormal condition within the predetermined distance ahead of the train and display the alert message corresponding to the abnormal condition.

7. The system of claim 6, further comprising a dispatch center device configured to send out the alert message in accordance with the alarm information to remind changing the driver at a next station.

8. The system of claim 7, wherein the obstacle information comprises at least one of the following information: information indicating that a length of a track outline in an image is less than the short-focus visibility distance, information indicating that the length of the track outline is less than the predetermined distance, and reflection information in the scanned information.

9. The system of claim 5, wherein the processor is further configured to:
determine that there is the single track and the signal machine but no obstacle within the predetermined distance ahead of the train, when the scanned information is normal and the first image information and/or the second image information only contain signal machine information; or
determine that there is the track turnout and the signal machine but no obstacle within the predetermined distance ahead of the train, when the scanned information is normal and the first image information and/or the second image information only contain track turnout information and the signal machine information; or
determine that there is the single track but no signal machine and obstacle within the predetermined distance ahead of the train, when the scanned information, the first image information and the second image information are all normal; or
determine that there is the single track, the signal machine and the obstacle within the predetermined distance ahead of the train, when the scanned information contains obstacle information and the first image information and/or the second image information contain merely the signal machine information; or
determine that there is the track turnout, the signal machine and the obstacle within the predetermined distance ahead of the train, when the scanned information contains the obstacle information and the first image information and/or the second image information contain merely the track turnout information and the signal machine information; or
determine that there is the single track and the obstacle but no signal machine within the predetermined distance ahead of the train, when the scanned information contains the obstacle information and both the first image information and the second image information are normal.

10. The system of claim 9, wherein the processor is further configured to:
in the case that the scanned information contains the obstacle information and the first image information and/or the second image information contain only the signal machine information having color abnormal information, determine a first distance between the obstacle and the train and a second distance between the signal machine and the train, determine a first safety distance as a shorter distance between the first distance and the second distance, and send out a corresponding first safety alert signal based on the color abnormal information and the first safety distance; or
in the case that the scanned information contains the obstacle information and the first image information and/or the second image information contain only the track turnout information and the signal machine information having color abnormal information, determine a first distance between the obstacle and the train and a second distance between the signal machine and the train, determine a second safety distance in a direction of a switch position of the track turnout as the shorter distance between the first distance and the second distance, and send out a corresponding second safety alert signal based on a first color abnormal information in the color abnormal information and the second safety distance; or
in the case that the scanned information is normal and the first image information and/or the second image information contain only the track turnout information and normal signal machine information, determine a third safety distance as the short-focus visibility distance or a distance from the train to a center of the track turnout and send out a corresponding third safety alert signal based on the third safety distance.

11. The system of claim 5, further comprising a positioner, wherein: the positioner is configured to determine positioning information within the predetermined distance ahead of the train; and
the processor is further configured to perform a synthesis logic analysis on the first image information, the second image information, the scanned information, and the positioning information based on a preset logic synthesis rule, and identify the abnormal condition within the predetermined distance ahead of the train according to an analysis result.

12. The system of claim 11, wherein the processor is further configured to:
determine that there is the single track, the signal machine but no obstacle within the predetermined distance ahead of the train, when the scanned information is normal and the positioning information only contains the positioning information of the signal machine; or determine that there is the track turnout, the signal machine but no obstacle within the predetermined distance ahead of the train, when the scanned information is normal and the positioning information contains the positioning information of the signal machine and the track turnout; or determine that there is the single track but no signal machine and obstacle within the predetermined distance ahead of the train, when both the scanned information and the positioning information are normal; or determine that there is the single track, the signal machine and the obstacle within the predetermined distance ahead of the train, when the scanned information contains the obstacle information and the positioning information only contains the positioning information of the signal machine; or determine that there is the track turnout, the signal machine and the obstacle within the predetermined distance ahead of the train, when the scanned information contains the obstacle information and the positioning information contains the positioning information of the signal machine and the track turnout; or determine that there is the single track, the obstacle but no signal machine within the predetermined distance ahead of the train, when the scanned information contains the obstacle information and the positioning information is normal.

13. The system of claim 12, wherein the processor is further configured to:

in the case that the scanned information contains the obstacle information, the positioning information contains only the positioning information of the signal machine and the first image information and/or the second image information contain the signal machine information having color abnormal information, determine a first distance between the obstacle and the train and a second distance between the signal machine and the train, determine a first safety distance as a shorter distance between the first distance and the second distance, and send out a corresponding first safety alert signal based on the first safety distance; or in the case that the scanned information contains the obstacle information, the positioning information contains the positioning information of the signal machine and the track turnout and the first image information and/or the second image information contain the signal machine information having color abnormal information, determine a first distance between the obstacle and the train and a second distance between the signal machine and the train, determine a second safety distance in a direction of a switch position of the track turnout as a shorter distance between the first distance and the second distance, and send out a corresponding second safety alert signal based on a first color abnormal information in the color abnormal information and the second safety distance; or in the case that the scanned information is normal, the positioning information contains the positioning information of the signal machine and the track turnout and the first image information and/or the second image information contain normal signal machine information, determine a third safety distance as the short-focus visibility distance or a distance from the train to a center of the track turnout, and send out a corresponding third safety alert signal based on the third safety distance.

* * * * *